United States Patent [19]
Kraus et al.

[11] 3,769,837
[45] Nov. 6, 1973

[54] ARRANGEMENT FOR DETERMINING THE CONSTITUENTS OF A GAS MIXTURE

[75] Inventors: Thaddaus Kraus, Vaduz; Gerold Paesold, Balzers, both of Liechtenstein; Elmar Metzler, Feldkirch, Austria

[73] Assignee: Balzers Patent und Beteiligungs Aktiengesellschaft, Balzers, Liechtenstein

[22] Filed: June 3, 1971

[21] Appl. No.: 149,711

[30] Foreign Application Priority Data
June 4, 1970 Switzerland.................... 8418/70

[52] U.S. Cl. .............................................. 73/23
[51] Int. Cl. .......................................... G01n 31/06
[58] Field of Search .................. 73/23, 23.1; 55/33, 55/34, 35, 74, 77, 79, 161, 208, 390

[56] References Cited
UNITED STATES PATENTS
2,792,071   5/1957   Pennington........................ 55/34 X
3,405,508   10/1968  Peters et al........................ 55/77 X

*Primary Examiner*—Charles A. Ruehl
*Attorney*—Toren and McGeady

[57] ABSTRACT

In an arrangement for checking on the constituents of a gas mixture, a passageway is provided containing a sorption agent for combining with one or more of the constituents of the mixture so that the remaining portion can be passed through a gas detector. The passageway, which is preferably tubular, is arranged to be heated and cooled for providing it with a heated zone and a separate cooled zone. Vibrators are connected to the passageway for displacing the sorption agent between the heated zone and the cooled zone whereby after certain gas constituents are removed from the gas mixture, the sorption agent can be regenerated by heating it in the heated zone and driving off the previously combined gas constituents which are then removed from the passageway.

12 Claims, 2 Drawing Figures

PATENTED NOV 6 1973

3,769,837

INVENTORS
THADDAÜS KRAUS
GEROLD PAESOLD
BY ELMAR METZLER

Toren & McGeady
ATTORNEYS

ARRANGEMENT FOR DETERMINING THE CONSTITUENTS OF A GAS MIXTURE

SUMMARY OF THE INVENTION

The present invention is directed to an arrangement for determining the contents of a gas mixture and, more particularly, it is directed to the separation of selected constituents from the gas mixture by use of a sorption agent and then for the regeneration of the sorption agent by driving off the combined gas constituents.

It has become increasingly important to be able to provide an exact determination of the constituents of a gas mixture, such as in determining the contents of a gas mixture obtained as a sample when a material is heated under a vacuum. Many of the properties of a metal, such as its hardness and deformability as well as its electric conductivity, depend on the type and quantity of the gases contained or dissolved in it in the form of inclusions. In metals, and particularly in steel, the amount of hydrogen, nitrogen and oxygen contained in the metal is a primary determining factor in its various characteristics.

In the so-called hot extraction analysis, the gas mixture to be examined is driven from a sample by heating, such as by melting under a vacuum or in a carrier gas stream, and then the separated gases are conveyed to detectors. In this disclosure, detectors are all such measuring devices which indicate the type and or quantity of at least one component or constituent of a gas mixture. Various gas detectors and analyzers are known and have been described in the art.

Generally speaking, selective detectors, for instance mass spectrometers, are costly instruments. Whenever possible, it is preferred to use non-selective detectors and to separate any accompanying gases before hand which might have a disturbing effect on the detecting operation. For example, a pressure gauge can be used as the detector if it is possible to separate out the desired component or constituent of the gas mixture and convey it in its separated form to the detector.

It is a primary object of the present invention, to provide a new apparatus in which certain gas components or constituents of a gas mixture, obtained from a gas source, can be combined with a suitable sorption agent from which the constituents can be subsequently separated by reversing the sorption action. Therefore, it is possible to perform a quantitative analysis on the remaining portion of the gas mixture, undisturbed by the combined constituents. Subsequently, the sorbent or sorption agent can be regenerated and reused. It is especially important that the sorption agent be regenerated after each use so that measuring errors due to irregular sorption are eliminated or the difficult estimation of reduced effectiveness of a partially gas-laden sorption agent in subsequent determinations is avoided.

Another object of the invention is to provide a rapid regeneration of the sorption agent in view of the economic advantage gained by such an operation.

In accordance with the present invention, for analyzing a gas mixture given off from a gas source, such as from a molten metal in a vacuum hot-extraction furnace, a gas detector is provided in combination with a sorption trap for the selected and reversible combination of certain constituents of the gas mixture being analyzed. Further, the sorption trap provides a passageway for a granular sorption agent and has a heated zone and a separate cooled zone between which the sorbent agent can be moved by a vibrating device associated with the sorption trap.

The provision in the present arrangement of different temperature zones within the sorption trap into which the granular sorption agent can be moved affords a considerable improvement over the various devices known in the past which utilized sorption traps for analyzing gases. These known sorption traps required the periodic replacement of the sorbent since after repeated use the gas combining capacity of the sorption agent gradually dropped off and, as a result, errors in measurement occurred or complicated corrections were required in the measurements. In the past it was known to use sorption agents in sorption traps which could be regenerated, however, the regeneration process was very time consuming, even if the separation of the gas from the sorption agent could be accomplished by heating without removing it from the trap. The trap, in fact, has a relatively great heat capacity, so that for heating or cooling the trap and the sorption agent a corresponding amount of heat must be supplied or removed. By comparison, in accordance with the present invention, only the sorption agent needs to be exposed to a temperature variation after each gas sampling, and a small quantity of the sorption agent is sufficient since it is regenerated after each use.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
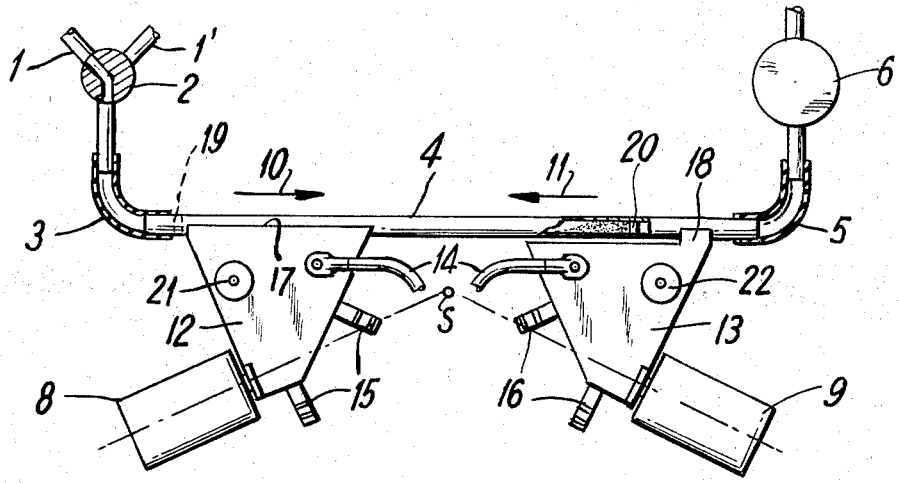
FIG. 1 is a schematic arrangement of a gas sorption apparatus embodying the present invention.

In the drawing two different embodiments of the invention are illustrated, in each embodiment the sorption trap is in the form of a tubular member which is heated for at least a portion of its length. Vibrating equipment is associated with the sorption trap in each embodiment for conveying the granular sorption agent through the tubular member between a heated zone and a cooled zone. In the embodiment shown in FIG. 1 the tubular member affords a through-passageway and is used when the gas is removed from its source by a carrier gas stream and the embodiment shown in FIG. 2 is used when the gas is extracted from its source under a vacuum.

Figure 2:
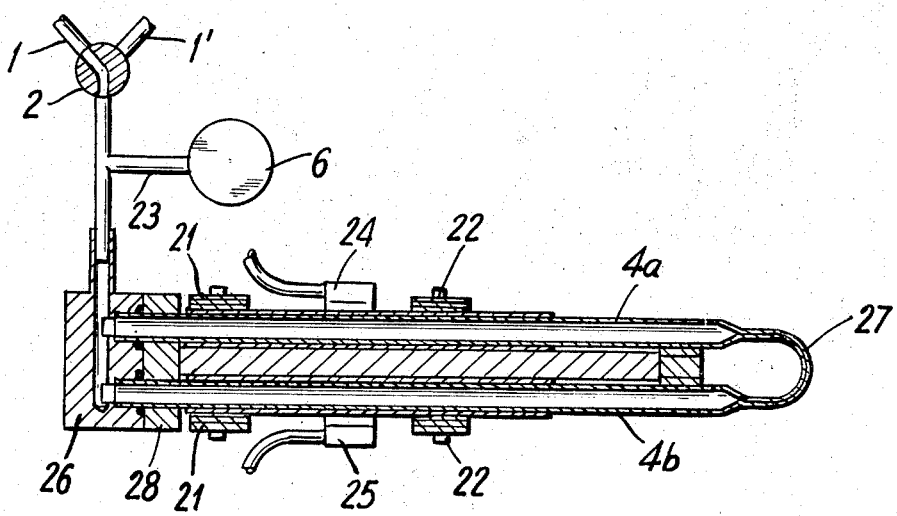
FIG. 2 is a sectional view of another embodiment of the invention.

In FIG. 1, a supply 1 is connected to a valve 2 which, in turn, is connected to a flexible connecting line 3. The valve 2 is also connected to a line 1' through which a gas stream can be supplied for use in flushing the sorption trap. Accordingly, valve 2 is a multi-way member for supplying a flow of gas from either supply line 1 or line 1' into the flexible connecting line 3. A tubular member 4 containing a quantity of granular sorption agents is connected at one end to the connecting line 3 and at its other or outlet end to another flexible connecting line 5 which joins the tubular member 4 to a detector 6. The gas which flows through the tubular member 4 and is not combined with the sorption agent flows through the connecting line 5 into the detector 6. Adjacent the inlet and outlet ends of the tubular member 4, vibrators 8, 9 are positioned for selectively vibrating the tubular member and thereby conveying the granular sorption agent toward one or the other of its ends. The flexible connecting lines 3,5 afford the necessary connection between the valve 2 and the detector 6 while absorbing the vibrating action. The vibrators are electromagnetically driven and vibrator 8 transports the sorption agent in the direction of the arrow 10 while the vibrator 9 transports the sorption agent in the direction of the arrow 11.

To provide a heated zone with the tubular member 4 which is formed of a metal, a passage of current is directed through a portion of the tubular member so that it can be heated with the tube itself acting as an electric heating resistance. Additionally, a cooled zone is provided at the inlet end of the tubular member 4. It will be noted in FIG. 1 that the vibrators 8 and 9 are spaced from the tubular member 4 and the vibrating action is transmitted to the tubular member through the vibration transmitting elements 12, 13 and the suspension elements 21, 22. In addition to transmitting vibrations, elements 12, 13 are each connected to a cable 14 for passing current from one of the elements 12, 13 through the tubular member and into the other element. Further, each of the vibration transmitting elements 12, 13 has a coolant water inlet and outlet 15, 16 respectively, for providing the desired cooling of the tubular member. In FIG. 1 it will be noted that the vibration transmitting element 12 is in contact with tubular member 4 along the full extent of its side 17 for effecting good heat transfer therebetween, however, the other vibration transmitting element 13 along the corresponding side is only in contact with the tubular member over a short portion 18 of its length so that, relative to element 12, element 13 provides just sufficient cooling action for cooling the adjacent junction between the tubular member 4 and the connecting line 5. Accordingly, when current is passed through the tubular member the heated zone is formed in that portion of the tubular member adjacent its outlet end.

To prevent the granular sorption agent from being displaced out of the tubular member 4 when it is moved in the direction of the arrows 10, 11, a gas-permeable plug or body 19, 20, formed as a porous sintered body, is located at each end of the tubular member.

By the proper arrangement of the vibrating assembly and the heating and cooling system for the tubular member, it is possible to provide a heated zone and a cooled zone within the tubular member and to transport the sorbent agent selectively between the two zones. This arrangement can be designed in a various number of ways, however, the embodiment shown in the drawing has proved very satisfactory. With regard to the construction of the vibrating assembly the following features should be noted: the elastic suspensions 21,22 provided between the vibration transmitting elements 12,13 and the tubular member 4 are spaced apart as far as possible and are symmetrically arranged with respect to the center of gravity S of the vibrating assembly. Furthermore, as indicated in FIG. 1, the lines of action of the forces produced by the vibrators 8,9 intersect at the center of gravity S. The moment of inertia in relationship to the axis passing through the center of gravity, that is normal to the plane of the paper, should be as great as possible to suppress the development of any undesirable rotational vibrations about this axis. The driving frequency is advantageously selected so that it is in resonance with the natural frequency of the vibrating system with respect to the desired transport vibrations, while differing as much as possible from the natural frequency of the undesirable rotational vibrations.

In the embodiment shown in FIG. 1 a quantity of gas to be examined, given off by a gas source, is supplied to the sorption trap through the supply line 1. Initially, the sorption agent within the tubular member is located adjacent the inlet end of the trap, that is in the cooled zone of the tubular member. As the gas mixture flows through the tubular member 4, the gas constituents to be separated out are combined with the sorption agent and the gas or gas mixture which exits from the opposite end through the connecting line 5 contains only the constituent or constituents to be identified by the detector. After the processing of a gas sample, the sorption agent is conveyed by the vibrator assembly from the cooled zone to the heated zone within the tubular member and, due to its exposure to the heat, the combined gases are driven off from the sorption agent and are removed through line 5 or are carried away by a stream of flushing gas which can be introduced into the trap entering by way of line 1' and valve 2. For regneration of the sorption agent, a certain gas, for instance, oxygen or air, can be passed over the sorption agent. After the regeneration has been effected, the sorption agent is moved to the opposite end, that is the cooled zone within the tubular member, by the vibrator assembly and is in position for the next sample.

In FIG. 2 another form of the sorption trap is illustrated with the tubular member being formed by two spaced parallel tube sections 4a,4b in which the sorption agent is arranged. In fact, the tubes 4a,4b are one continuous tube having a elongated U-shaped configuration with the bight or bend portion 27 of the tube being closed so that a blind passage is provided within the tube portions 4a,4b. At the open end of the tube portions 4a,4b they communicate with supply line 1 and auxiliary line 1' through the valve 2 and through line 23 with the detector 6. The upper tubular portion 4a is provided with a cable connection 24 and the lower tube portion 4b with a cable connection 25 so that current can be passed through the tubular member from one cable connection to the other for providing a heated zone within each of the separate passages within the tubular member. Further, the open ends of the tubular portions 4a,4b are secured within a cooled flange block 26 so that a cooled zone is provided at the open end of each of the tubular portions. As indicated, the simplest way to form the tubular member is to press the bight or bent portion 27 into a closed arrangement. In FIG. 2 the elastic suspensions 21,22 are shown in a plane perpendicular to the plane of FIG. 1, but otherwise the arrangement of the vibrator assembly would be the same for each embodiment. Another flange 28 is fitted over the tubular portions 4a,4b adjacent their open ends which is attached to the flange block 26 and when the flange 28 is detached from the block the sorption agent can be added into or removed from the tubular portions.

In analyzing a gas sample with the embodiment shown in FIG. 2, an aliquot part of the gas sample to be examined is delivered through supply line 1 and valve 2 into the sorption trap which consists of the separate tube portions 4a,4b and within the passages formed in the tube portions a selective sorption takes place as the gas contacts the sorption agent. While the sorption action takes place the gas is blocked off in the sorption trap by means of the valve 2 and a pressure reduction results due to the combination of a part of the gas with the sorption agent. The residual pressure, which can be determined by means of a manometer acting as the detector 6 provides a direct measure of the quantity of the specific gas constituent being checked.

By the sorbent or sorption agents as used in this disclosure is meant all substances which are capable of combining with a gas. This combining action can involve the combination of the gases to the surface of the sorption material, that is adsorption, or it can involve the combination within the interior of the sorption material, that is absorption. The manner in which the gas combines with the sorption material is of importance only to the extent that it is possible to reverse the sorption action and to return the sorption material to its original condition, that the combining effect must be reversible. Among the materials useful for providing the sorption action are zeolites frequently used in chemical technology and obtainable on the market under the designation "molecular sieves." In the instance of the hot extraction of steel samples in a graphite crucible, where hydrogen, nitrogen and carbon monoxide are primarily given off, the hydrogen and carbon monoxide constituents of the gas mixture can be combined quantitatively with zeolites covered with an oxide of copper, manganese, chromium, or silver, so that only nitrogen remains uncombined and can be checked separately in a detector. For the regeneration of the sorption agent by heating it is necessary to carry or flush away the released gases, or any gaseous reaction products which are formed during the sorption action, and such gases or gaseous products can be removed by passing a stream of a neutral flushing gas through the sorption trap. In the above example of the sorption action of hydrogen and carbon monoxide on oxide-laden zeolites, water and carbon monoxide are formed which initially combine with the sorption agent but are driven off when the agent is exposed to heat at about 300°C. However, the carbon monoxide is sorbed directly without transformation into another compound. The oxygen eliminated by the oxidation of the hydrogen and carbon monoxide from the oxide used for the sorption can be replaced by flowing air over the heated sorption material.

It is advisable to use just enough sorption agent so that in the particular application the sorption time and the regeneration time are approximately equal. If too much sorption agent is used, the sorption will take place faster, however, the time required for the desorption action will be proportionately much longer, and of course the reverse is also true. The optimum quantity of sorption agent for attaining as short as possible a sorption-regeneration cycle can be easily determined upon the preliminary experiments for each particular application.

While specific embodiments of the invention have been shown and described in detail to illustrate the application of the inventive principles, it will be understood that the invention may be embodied otherwise without departing from such principles.

What is claimed is:

1. Apparatus for determining the constituents of a gas mixture given off by a gas source, such as in the examination of gas samples obtained in a vacuum hot-extraction furnace, comprising a gas detector and a sorption trap arranged in communication with one another for selectively removing certain constituents of the gas mixture for detecting the remaining constituents in said gas detector, wherein the improvement comprises that said sorption trap includes wall means forming a laterally closed passageway, a granular sorption agent located within and movably displaceable through said passageway, means closing at least one end of said passageway for admitting a gas mixture thereto so that the gas mixture after passing through said passageway in contact with the sorption agent flows to said gas detector, means for forming a heated zone and a separate cooled zone in said passageway for selectively heating and cooling said sorption agent, and vibrating means for selectively displacing said sorption agent through said passageway between the heated and cooled zones therein.

2. Apparatus, as set forth in claim 1, wherein said wall means comprises an elongated tubular member, said vibrating means comprising a pair of vibrators connected to said tubular member in spaced positions along its length and said vibrators being selectively operable one at a time for conveying the sorption agent through the passageway within said tubular member between the heated zone and the cooled zone.

3. Apparatus, as set forth in claim 2, wherein the said tubular member haivng an inlet at one end for receiving the gas mixture to contact the sorption agent therein and an outlet at its oppositely disposed end connected to said gas detector.

4. Apparatus, as set forth in claim 3, wherein said means for forming a heated zone and a separate cooled zone in said passageway comprises a first device for forming the cooled zone located at the inlet end of said tubular member and a second device for forming the heated zone located in spaced relationship from the inlet end of said tubular member.

5. Apparatus, as set forth in claim 4, wherein said second device comprises a pair of longitudinally spaced connections for passing a current through said tubular member so that it acts as an electric heating resistance for forming the heated zone in said passageway.

6. Apparatus, as set forth in claim 1, wherein said wall means comprises an elongated tubular member having an inlet at one end and an outlet at its opposite end with said passageway extending continuously therebetween, a first flexible line connected at one end to the inlet end of said tubular member, said means closing at least one end of said passageway comprising a multi-way valve located at the other end of said first flexible line, a second flexible line connected at one end to the outlet end of said tubular member and at its opposite end to said detector member, said vibrating means comprising a pair of elastic suspension elements each positioned adjacent to and connected to an opposite end of said tubular member, a separate vibration transmitting element mounting each said suspension element, and a vibrator secured to each said transmitting element for supplying vibrating action to said tubular member through the cooperating trasmitting element and suspension element.

7. Apparatus, as set forth in claim 6, wherein said vibrators being symmetrically arranged on opposite sides of the center of gravity of said vibrating means and the lines of action of said vibrators intersecting at the center of gravity.

8. Apparatus, as set forth in claim 7, wherein said means for forming a heated zone and a separate cooled zone in said passageway includes a flow passage in each said transmitting element for flowing a cooling medium therethrough for cooling said passageway, one of said transmitting elements located adjacent the inlet end of said tubular member and the other one of said transmitting elements located adjacent the outlet end of said tubular member and the one of said transmitting elements adjacent the inlet end of said tubular member being in heat transfer relationship with said tubular member for a considerably greater longitudinal distance than the other one of said transmitting elements so that a greater cooling effect is provided to said tubular member at the inlet end of said passageway.

9. Apparatus, as set forth in claim 8, wherein said means for forming a heated zone and a separate cooled zone includes a cable connection secured to each of said transmitting elements for providing a flow of current therethrough to said tubular member for effecting heating of said passageway therethrough.

10. Apparatus, as set forth in claim 9, wherein a gas-permeable body being fitted into each of the opposite ends of said tubular member for preventing the sorption agent from being displaced from said passageway within said tubular member.

11. Apparatus, as set forth in claim 1, wherein said wall means comprises an elongated U-shaped tube member with the bight portion of the U-shaped tube member being closed so that a separate dead-end passageway is formed in each leg of said tubular member, said means for forming a heated zone and a separate cooled zone in said passageway includes a block supporting the opposite free end of said tubular member and said block forming a common chamber for the free ends of said tubular member, said block being arranged to be cooled for cooling the opposite ends of said U-shaped tubular member, and cables connected to said tubular member on each side of its bight portion in spaced relationship from said block for passing current through said tubular member and providing the heated zone in each of said passageways therein, said means closing at least one end of said passageway includes a conduit connected to the chamber in said block and a multi-way valve connected to said conduit for admitting a gas mixture into the passageways in said tubular member, a branch line connected to said conduit between said multi-way valve and said block, and said detector connected to the end of said branch line spaced from said conduit.

12. A method of determining the gas constituents in a gas mixture comprising forming a laterally closed passageway containing a granular sorption agent, heating a portion of the passageway to provide a heated zone therein, cooling a portion of the passageway to provide a cooled zone therein, locating the sorption agent in the cooled zone, flowing a gas mixture into the passageway for effecting the combination of at least one of its constituents with the sorption agent, vibrating the passage for moving the sorption agent from the cooled zone into the heated zone for effecting regeneration of the sorption agent and the separation of its combined constituent gas.

* * * * *